United States Patent
Zhang

(10) Patent No.: US 11,328,459 B2
(45) Date of Patent: May 10, 2022

(54) METHOD AND APPARATUS FOR REALIZING COLOR TWEEN ANIMATION

(71) Applicant: Advanced New Technologies Co., Ltd., Grand Cayman (KY)

(72) Inventor: Nana Zhang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 17/181,647

(22) Filed: Feb. 22, 2021

(65) Prior Publication Data

US 2021/0174558 A1  Jun. 10, 2021

Related U.S. Application Data

(63) Continuation of application No. 16/673,621, filed on Nov. 4, 2019, now Pat. No. 10,930,026, which is a
(Continued)

(30) Foreign Application Priority Data

Jan. 20, 2016 (CN) .......................... 201610037303.X

(51) Int. Cl.
*G06T 11/00* (2006.01)
*G06T 13/80* (2011.01)
(Continued)

(52) U.S. Cl.
CPC ............ *G06T 11/001* (2013.01); *G06T 11/40* (2013.01); *G06T 13/80* (2013.01); *G06T 15/503* (2013.01); *G06T 2210/62* (2013.01)

(58) Field of Classification Search
CPC ....... G06T 11/001; G06T 11/40; G06T 13/80; G06T 15/503; G06T 2210/62
See application file for complete search history.

(56) References Cited

U.S. PATENT DOCUMENTS 7,136,069 B1 * 11/2006 Dawson ................. G06T 15/04
 345/582
7,720,312 B2 * 5/2010 Maier ................... G06T 15/503
 382/302
(Continued)

FOREIGN PATENT DOCUMENTS

CN 102572304 0/7201
CN 561954 1/1981
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Terrell M Robinson
(74) *Attorney, Agent, or Firm* — Fish & Richardson P.C.

(57) ABSTRACT

A start fill scheme in a first layer that is initially non-transparent is displayed on a display of a computing device. An end fill scheme in a different second layer that overlaps the first layer and is initially at least partially transparent is displayed on the display. A first transparency value of the first layer is gradually changed to a value corresponding to transparency. A second transparency of the second layer is gradually changed to a value corresponding to non-transparency. Both the first transparency value and the second transparency value are gradually changed during a particular time period. Gradually changing the first transparency value and the second transparency value includes changing the values by a plurality of increments over the particular time period.

20 Claims, 7 Drawing Sheets

Display a start fill scheme at a non-transparent layer, and display an end fill scheme at a completely transparent layer  — 110

Gradually change transparency of the non-transparent layer to completely transparent, and gradually change transparency of the completely transparent layer to completely non-transparent — 120

Related U.S. Application Data continuation of application No. 16/040,256, filed on Jul. 19, 2018, now Pat. No. 10,467,778, which is a continuation of application No. PCT/CN2017/070799, filed on Jan. 10, 2017.

(51) Int. Cl.
 *G06T 15/50* (2011.01)
 *G06T 11/40* (2006.01)

(56) References Cited

U.S. PATENT DOCUMENTS

| | | | |
|---|---|---|---|
| 7,925,582 B1 | 4/2011 | Kornegay et al. | |
| 8,683,360 B2 | 3/2014 | Aso et al. | |
| 8,948,509 B2 | 2/2015 | Wright | |
| 9,830,646 B1 | 11/2017 | Wasser et al. | |
| 10,467,778 B2 | 11/2019 | Zhang | |
| 10,930,026 B2 | 2/2021 | Zhang | |
| 2005/0086155 A1* | 4/2005 | Villacorta | G06Q 40/025 705/38 |
| 2005/0213853 A1 | 9/2005 | Maier et al. | |
| 2005/0273422 A1 | 12/2005 | Villacorta et al. | |
| 2006/0044323 A1 | 3/2006 | Ameline et al. | |
| 2007/0103483 A1 | 5/2007 | Glen | |
| 2008/0278519 A1 | 11/2008 | Mao et al. | |
| 2009/0049389 A1* | 2/2009 | Kuzmanovic | G06F 9/451 715/745 |
| 2012/0198370 A1 | 8/2012 | Aso et al. | |
| 2012/0262483 A1 | 10/2012 | Kim | |
| 2013/0019197 A1* | 1/2013 | Brugler | G06F 11/324 715/772 |
| 2013/0057555 A1 | 3/2013 | Huang et al. | |
| 2013/0100133 A1 | 4/2013 | Elber | |
| 2013/0120444 A1* | 5/2013 | Allyn | G06T 13/00 345/629 |
| 2014/0002487 A1 | 1/2014 | Manson | |
| 2014/0096092 A1* | 4/2014 | Johnson | G06F 3/04883 715/863 |
| 2014/0133748 A1 | 5/2014 | Wright | |
| 2014/0300610 A1 | 10/2014 | Mayhew | |
| 2016/0098972 A1 | 4/2016 | Feit et al. | |
| 2016/0284114 A1 | 9/2016 | Kim et al. | |
| 2018/0322663 A1 | 11/2018 | Zhang | |
| 2020/0066005 A1 | 2/2020 | Zhang | |

FOREIGN PATENT DOCUMENTS

| | | | |
|---|---|---|---|
| CN | 101303849 | | 11/2008 |
| CN | 101556788 | | 10/2009 |
| CN | 101833447 | | 9/2010 |
| CN | 101872600 | A | 10/2010 |
| CN | 101981931 | A | 2/2011 |
| CN | 102541441 | | 7/2012 |
| CN | 102981710 | | 3/2013 |
| CN | 102981710 | A * | 3/2013 |
| CN | 103970415 | | 8/2014 |
| CN | 104216752 | | 12/2014 |
| CN | 105719332 | | 6/2016 |
| EP | 2511901 | | 10/2012 |
| JP | 2003216649 | | 7/2003 |
| JP | 2012138042 | | 7/2012 |
| KR | 20120117578 | | 10/2012 |
| TW | 201312446 | A | 3/2013 |
| WO | WO 2012008099 | | 1/2012 |

OTHER PUBLICATIONS

European Extended Search Report in European Patent Application No. 17740974.5, dated Aug. 20, 2019, 8 pages.
International Preliminary Report on Patentability in International Application No. PCT/CN2017/070799, dated Jul. 24, 2018, 12 pages (with English Translation).
International Search Report issued by the International Searching Authority in International Application No. PCT/CN2017/070799 dated Apr. 12, 2017; 10 pages.
Nakamoto, "Bitcoin: A Peer-to-Peer Electronic Cash System," www.bitcoin.org, 2005, 9 pages.
Sato et al, "A paint tool that can paint on 3D objects: Painter 3D Japanese Version," Japan SoftBank Corp., Sep. 1, 1998, 6 pages (with English translation).
Office Action in Taiwanese Appln. No. 105143381, dated Apr. 16, 2019, 21 pages (with English machine translation).

* cited by examiner

METHOD AND APPARATUS FOR REALIZING COLOR TWEEN ANIMATION

This application is a continuation of U.S. patent application Ser. No. 16/673,621, filed Nov. 4, 2019, which is a continuation of U.S. application Ser. No. 16/040,256, filed on Jul. 19, 2018, now U.S. Pat. No. 10,467,778, issued Nov. 5, 2019, which is a continuation of PCT Application No. PCT/CN2017/070799, filed on Jan. 10, 2017, which claims priority to Chinese Patent Application No. 201610037303.X, filed on Jan. 20, 2016, and each application is hereby incorporated by reference in its entirety.

TECHNICAL FIELD

The present application relates to the field of image processing technologies, and in particular, to a method and an apparatus for realizing color tween animation.

BACKGROUND

Animation includes frame-by-frame animation and tween animation. The frame-by-frame animation is to draw different content frame-by-frame based on the timeline and form an animation by consecutively playing these frames. The tween animation is to automatically generate an intermediate part of an animation by using software based on a start frame and an end frame of the known animation, which omits a complex process for making the intermediate part.

SUMMARY

Color tween animation is a type of tween animation. The color tween animation means that a fill color in a certain area changes with time to create animation effects. The color tween animation can be used alone or in combination with other tween animation (for example, shape tween animation, displacement tween animation, scaling tween animation, or rotation tween animation in a fill area) to create more complex animation effects.

The existing technology provides an animation realization for gradually changing a fill color in a certain display area from a first solid color to a second solid color. Generally, a color value of the fill color is gradually changed from a color value of the first solid color to a color value of the second solid color in accordance with a specified rule. However, for complex non-solid color fill schemes, such as fill schemes with gradual change, texture, pattern fill effects, etc., to create harmonious color effects, the fill schemes need to cooperate with each other when the color values change, since the color values of pixels in the display area are mostly different. In the existing technology, the color value change method generates an awkward and stiff animation with poor effects. As a result, a designer needs to provide fill schemes for an intermediate part of the animation, which means a high workload and low efficiency of animation realization.

The present application provides a method for realizing color tween animation, where a display area of the color tween animation includes two overlapping layers: one layer is non-transparent and the other layer is completely transparent. The method includes the following: displaying a start fill scheme at the non-transparent layer and displaying an end fill scheme at the completely transparent layer; and gradually changing transparency of the non-transparent layer to completely transparent and gradually changing transparency of the completely transparent layer to completely non-transparent.

The present application further provides an apparatus for realizing color tween animation, where a display area of the color tween animation includes two overlapping layers: one layer is non-transparent and the other layer is completely transparent. The apparatus includes the following: a start and end display unit, configured to display a start fill scheme at the non-transparent layer and display an end fill scheme at the completely transparent layer; and a first transparency change unit, configured to gradually change transparency of the non-transparent layer to completely transparent and gradually change transparency of the completely transparent layer to completely non-transparent.

It can be seen from the previous technical solutions that in the implementations of the present application, the layer displaying the start fill scheme is gradually changed from non-transparent to completely transparent. The layer displaying the end fill scheme is gradually changed from completely transparent to non-transparent, through changing transparency of the two overlapping layers in the display area of the color tween animation, to create animation effects of changing the start fill scheme to the end fill scheme. No matter if a fill scheme is complex or not, smooth and natural animation effects can be automatically created by using software without extra work of a designer, thereby improving animation realization efficiency.

DESCRIPTION OF IMPLEMENTATIONS

Implementations of the present application provide a new method for realizing color tween animation. A start fill scheme and an end fill scheme are respectively displayed on two overlapping layers in a display area. The layer displaying the start fill scheme is gradually changed from non-transparent to completely transparent. Moreover, the layer displaying the end fill scheme is gradually changed from completely transparent to non-transparent. The layers create animation effects of changing the start fill scheme to the end fill scheme. Smooth and natural animation effects can be created without extra work of a designer, thereby improving animation realization efficiency and resolving a problem in the existing technology.

The implementations of the present application can be applied to any device having computing, storage and display capabilities, including devices such as a mobile phone, a tablet computer, a personal computer (PC), a notebook, and a server.

In the implementations of the present application, the color tween animation is performed in a certain display area. The display area can be in any shape, of any size, and at any location. The display area can be fixed with a fixed shape, a fixed size, and a fixed location, or can change dynamically with a changing shape, a changing size, and/or a changing location. That is, the technical solutions for realizing color tween animation in the implementations of the present application can be used alone, or can be used in combination with technical solutions for realizing other tween animation (for example, shape tween animation, displacement tween animation, scaling tween animation, or rotation tween animation in a fill area).

In this implementation of the present application, the two layers are generated in the display area of the color tween animation during initialization. The two layers overlap each other. The transparency of one layer is set to completely transparent, and the transparency of the other layer is set to non-transparent. For a specific method for generating a layer and a specific method for setting transparency of a layer, references can be made to the existing technology for implementation. Details are not described.

The two overlapping layers have an upper and a lower layer superimposed on each other. When the upper layer is non-transparent, the lower layer is completely blocked, and the user views content displayed at the upper layer in the display area. When the upper layer is completely transparent, the lower layer is completely revealed, and the user views content displayed at the lower layer in the display area. Alternatively, when the transparency of the upper layer is a middle value between completely transparent and non-transparent, the content that the user views in the display area is the visual effects obtained after the upper layer and the lower layer are superimposed based on the middle value of the transparency.

Figure 1:
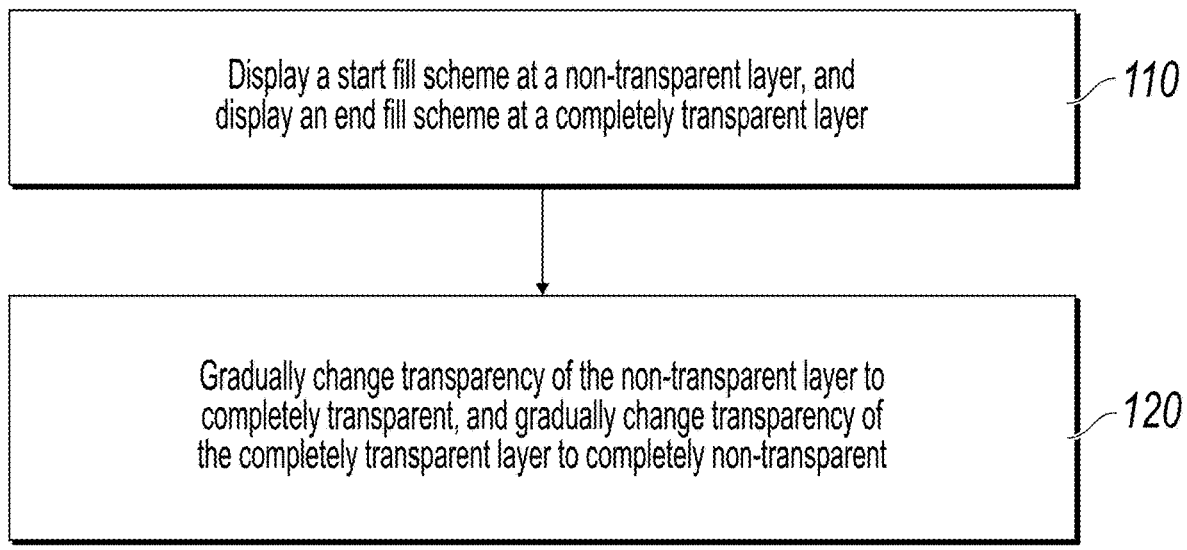
FIG. 1 is a flowchart illustrating a method for realizing color tween animation, according to an implementation of the present disclosure.

In implementation 1 of the present application, color tween animation realizes change from the start fill scheme to the end fill scheme with animation effects. The start fill scheme or the end fill scheme can be a solid color fill scheme, a fill scheme with fill effects of gradual change, texture, pattern, etc., or various other fill schemes with color change that are generated by the user. FIG. 1 is a flowchart illustrating a method for realizing color tween animation in this implementation.

Step 110: Display a start fill scheme at a non-transparent layer, and display an end fill scheme at a completely transparent layer.

After initialization is completed, there are two overlapping layers in a display area. One layer is the non-transparent layer, and the other layer is the completely transparent layer. The start fill scheme is displayed at the non-transparent layer, and the end fill scheme is displayed at the completely transparent layer. As such, the user can view visual effects corresponding to the start fill scheme in the display area.

Step 120: Gradually change transparency of the non-transparent layer to completely transparent, and gradually change transparency of the completely transparent layer to completely non-transparent.

In an animation duration of the tween animation, the transparency of the non-transparent layer is gradually changed from non-transparent to completely transparent. In the same animation duration, the transparency of the completely transparent layer is gradually changed from completely transparent to non-transparent. As such, the user can view the visual effects corresponding to the start fill scheme in the display area. The visual effects are changed with transparency in the animation duration, and are gradually changed to the visual effects corresponding to the end fill scheme. Therefore, the animation realization from the start fill scheme to the end fill scheme is completed.

The existing technology provides a plurality of methods for gradually changing transparency in the animation duration. References can be made to these methods for the implementations of the present application. It should be noted that methods for changing the transparency of the two layers can be independently performed, or can be cooperatively performed in an associated method. The transparency 0 indicates being completely transparent, and the transparency 1 indicates being non-transparent. In an example, the transparency of the upper layer can be changed from 0 to 1 at a constant speed in the animation duration, and the transparency of the lower layer can be quickly changed from 1 to 0 in the animation duration. In another example, the transparency of the upper layer can be quickly changed from 0 to 1 in animation duration, and the sum of the transparency of the upper layer and the transparency of the lower layer is 1.

After the transparency of the two layers is changed, the color tween animation ends. As such, the current completely transparent layer, that is, the layer displaying the start fill scheme in this implementation, can be deleted to release the occupied system resource in a timely manner.

In implementation 2 of the present application, there are N fill schemes (N is a natural number greater than or equal to 2). In the display area, the first fill scheme is changed to the second fill scheme with animation effects, and then the second fill scheme is changed to the third fill scheme with animation effects (when N is greater than or equal to 3), until the Nth fill scheme. Afterwards, the animation ends. Each fill scheme can be a solid color fill scheme, a fill scheme with fill effects of gradual change, texture, pattern, etc., or various other fill schemes with color changes that are generated by the user.

Figure 2:
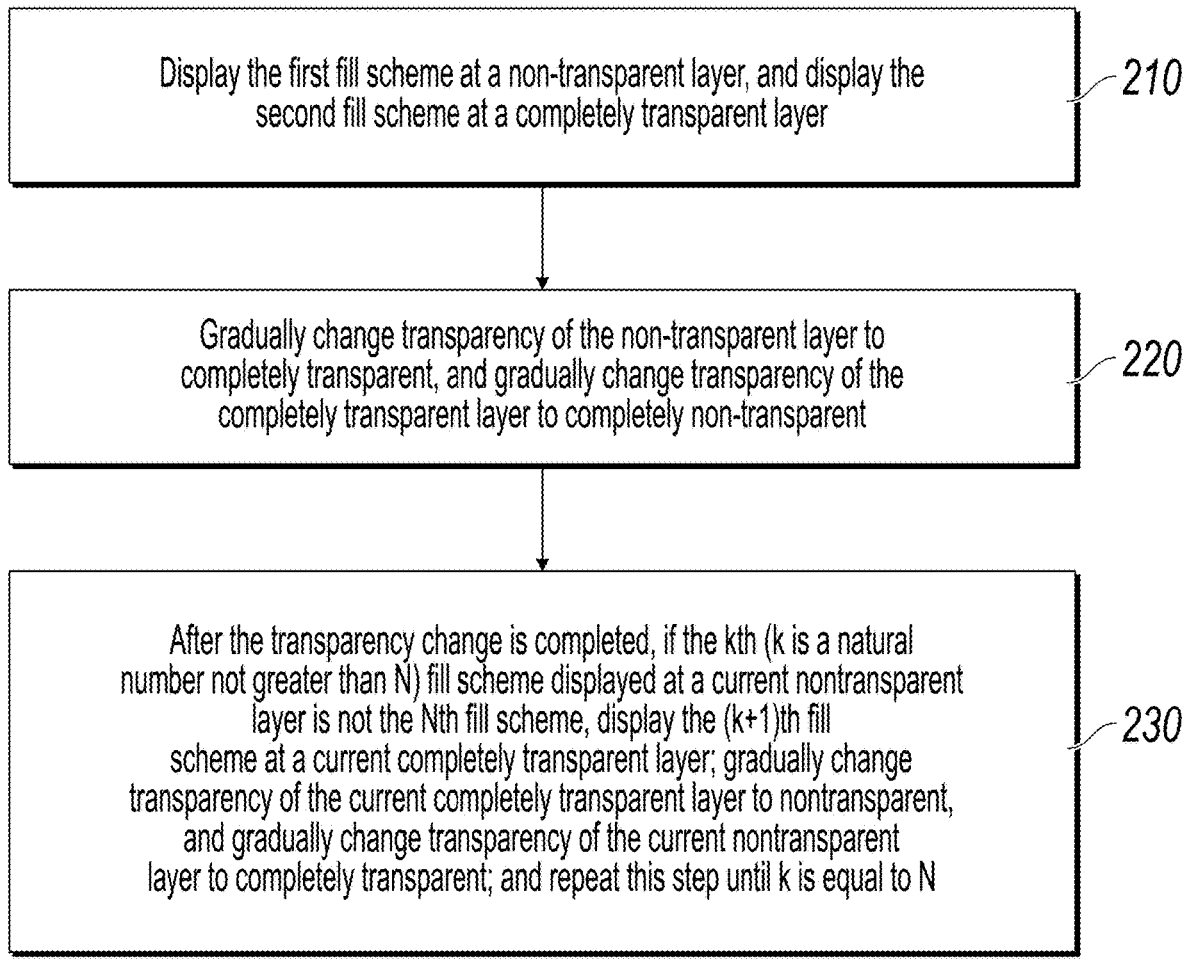
FIG. 2 is a flowchart illustrating another method for realizing color tween animation, according to another implementation of the present disclosure.

FIG. 2 is a flowchart illustrating a method for realizing color tween animation in this implementation. This implementation mainly describes parts different from implementation 1. For a same part, references can be made to descriptions in implementation 1, and the description is not repeated here.

Step 210: Display the first fill scheme at a non-transparent layer, and display the second fill scheme at a completely transparent layer.

Step 220: Gradually change transparency of the non-transparent layer to completely transparent, and gradually change transparency of the completely transparent layer to completely non-transparent.

Step 230: After the transparency change is completed, if the kth (k is a natural number not greater than N) fill scheme displayed at a current non-transparent layer is not the Nth fill scheme, display the (k+1)th fill scheme at a current completely transparent layer; gradually change transparency of the current completely transparent layer to non-transparent, and gradually change transparency of the current non-transparent layer to completely transparent; and repeat this step until k is equal to N.

After the transparency change is completed, it is assumed that the kth fill scheme is displayed at the current non-transparent layer (that is, the layer changed from completely transparent to non-transparent in the latest transparency change process), and the kth fill scheme is the last fill scheme of the color tween animation up until now in the current implementation. If k is not equal to N, the kth fill scheme further needs to be changed to the (k+1)th fill scheme through animation. If k is equal to N, the animation ends.

When k is not equal to N, the (k+1)th fill scheme is displayed at the current completely transparent layer (that is, the layer changed from non-transparent to completely transparent in the latest transparency change process). Then, in an animation duration from the kth fill scheme to the (k+1)th fill scheme, the transparency of the current completely transparent layer is gradually changed to non-transparent, and the transparency of the current non-transparent layer is gradually changed to completely transparent.

In this transparency change process, the user can view the visual effects corresponding to the kth fill scheme in the display area. The visual effects are changed with transparency in the animation duration and are gradually changed to the visual effects corresponding to the (k+1)th fill scheme.

The current non-transparent layer and the current completely transparent layer after the transparency change are interchanged with the current non-transparent layer and the current completely transparent layer before the transparency change. This step is repeated until k is equal to N. As such, the first fill scheme is changed to the second fill scheme with animation effects in the display area and sequentially changed to the Nth fill scheme one by one based on an arrangement order of the fill schemes. Afterwards, the animation ends.

When k is equal to N and the animation ends, the current completely transparent layer can be deleted.

It can be seen that, in implementation 1 and implementation 2 of the present application, the two overlapping layers are arranged in the display area: the first layer is gradually changed from non-transparent to completely transparent, and the second layer is gradually changed from completely transparent to non-transparent, to create animation effects of gradually changing the fill scheme at the first layer to the fill scheme at the second layer. In addition, the change process is smooth and natural, and extra manual work is avoided while good effects are achieved, thereby improving animation realization efficiency.

In an application example of the present application, an online credit reference system generates a credit score for each user by using a specified evaluation algorithm based on dimensions such as a credit history, a behavior preference, an agreement fulfillment ability, an identity, and a personal connection, and determines a credit rating of the user based on the credit score of the user. Each credit rating corresponds to a specified range of credit scores. The range of the credit scores of the user in the credit reference system is 350 to 950, which is divided into five credit ratings from 1 to 5. A higher rating indicates better credit.

Figure 3:
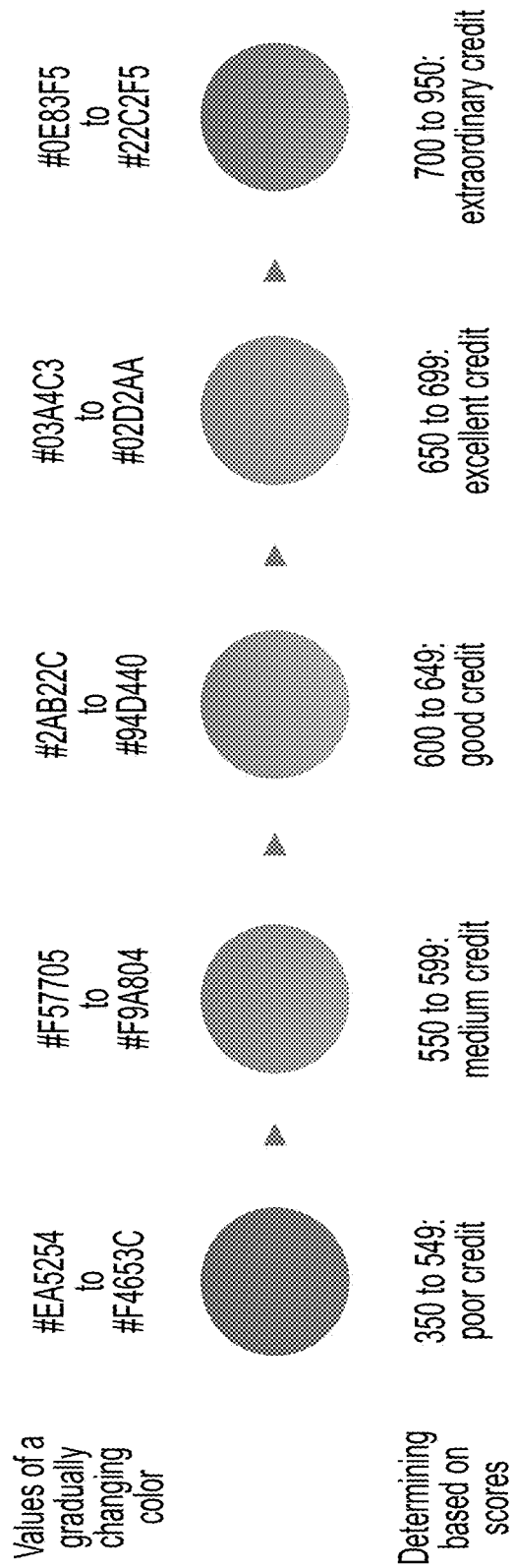
FIG. 3 is a schematic diagram illustrating a correspondence among a credit score of a user, a credit rating, and a fill scheme, according to an implementation of the present disclosure.

The user can view the user's credit rating at the client application (app) of the credit reference system. In the app, different credit ratings of the user are displayed in a circular area with a fill scheme with a gradual change effect of different colors. The kth fill scheme corresponds to the kth credit rating. FIG. 3 shows a correspondence among a credit score of a user, a credit rating, and a fill scheme in the credit reference system. The first fill scheme is a red fill scheme where a color value is gradually changed from #EA5254 to #F4653C, and corresponds to the first credit rating. Similarly, the second to the fifth fill schemes are respectively orange, green, cyan, and blue fill schemes with a gradual change effect, and respectively correspond to the second to the fifth credit ratings.

To improve user experience, when the user opens a page displaying the user's credit rating, a credit rating enhancement process of the user is displayed in an animation method from the first credit rating to the credit rating of the user. That is, in the circular area representing the credit rating, the intermediate fill schemes are traversed in an animation method from the first fill scheme to the Nth fill scheme corresponding to a credit rating N of the user. Afterwards, the animation ends.

Figure 4:
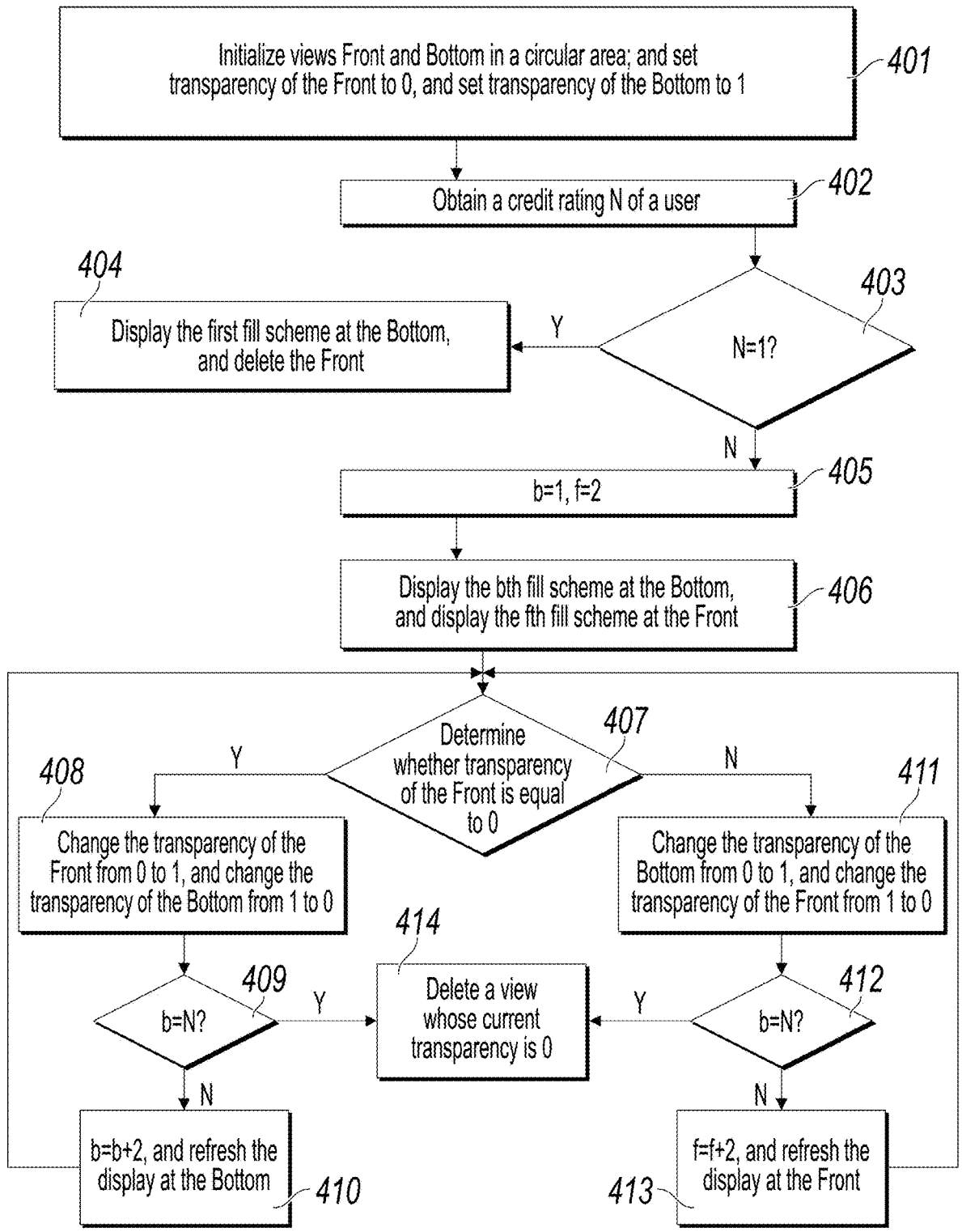
FIG. 4 is a flowchart illustrating animation display of a user credit rating, according to an implementation of the present disclosure.

FIG. 4 shows an animation realization process in this application example.

Step 401: Initialize two UIViews in a circular area, where an upper layer is a view Front, and a lower layer is a view Bottom; and set transparency of the Front to 0, and set transparency of the Bottom to 1. In this application example, the transparency 0 indicates completely transparent, and the transparency 1 indicates non-transparent.

Step 402: Obtain a credit rating N of a user.

Step 403: Determine whether N is 1; and if yes, perform step 404; or if no, go to step 405.

Step 404: Display the first fill scheme at the Bottom, delete the Front, and end the procedure. When the credit rating of the user is 1, there is no need to perform animation display, and the first fill scheme is directly displayed.

Step 405: Set b to 1, and set f to 2. Here, b indicates the sequence number of the fill scheme displayed at the Bottom, and f indicates the sequence number of the fill scheme displayed at the Front.

Step 406: Display the bth fill scheme at the Bottom, and display the fth fill scheme at the Front.

Step 407: Determine whether transparency of the current Front is 0; and if yes, perform step 408; or if no, go to step 411. This step is used to determine whether the current completely transparent layer is Front or Bottom.

Step 408: In a predetermined duration, change the transparency of the Front from 0 to 1 at a constant speed, and change the transparency of the Bottom from 1 to 0 at a constant speed. The predetermined duration is a predetermined duration for displaying animation effects between adjacent credit ratings.

Step 409: Determine whether f is equal to N; and if yes, end the animation, and go to step 414; or if no, perform step 410. In this step, alternatively, whether b is equal to (N−1) can be determined.

Step 410: Add 2 to b, refresh the display at the Bottom (that is, display the (b+2)th fill scheme), and go to step 407.

Step 411: In a predetermined duration, change the transparency of the Front from 1 to 0 at a constant speed, and change the transparency of the Bottom from 0 to 1 at a constant speed.

Step 412: Determine whether b is equal to N; and if yes, end the animation, and go to step 414; or if no, perform step 413. In this step, alternatively, whether f is equal to (N−1) can be determined.

Step 413: Add 2 to f, refresh the display at the Front (that is, display the (f+2)th fill scheme), and go to step 407.

Step 414: Delete a view whose current transparency is 0.

Figure 5:
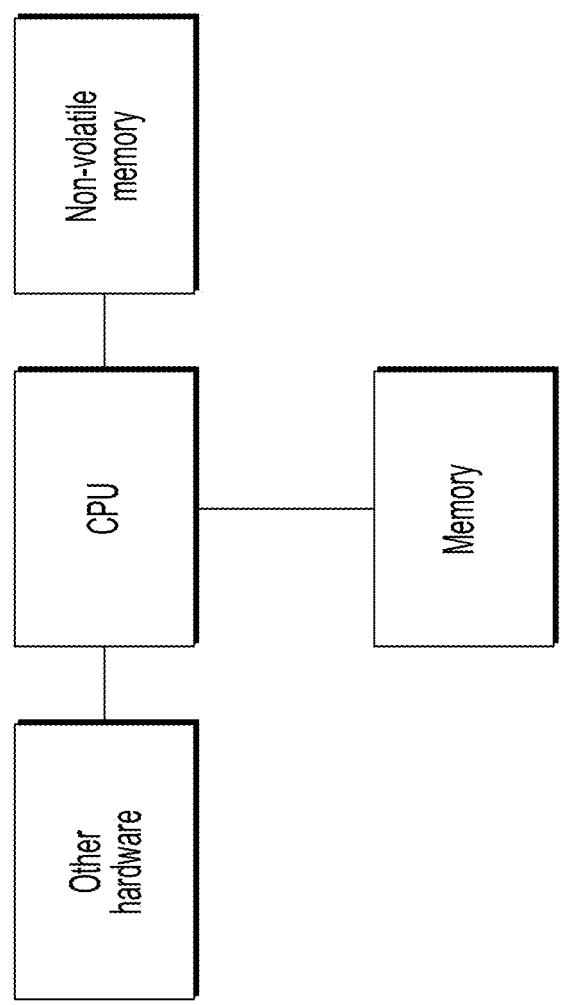
FIG. 5 is a hardware structural diagram illustrating a device, according to an implementation of the present disclosure.

Corresponding to the previous procedure implementation, the implementations of the present application further provide an apparatus for realizing color tween animation. The apparatus can be implemented by software, hardware, or a combination of hardware and software. Software implementation is used as an example. As a logical apparatus, the software is formed by reading a corresponding computer program instruction in a non-volatile memory and running the instruction in a memory by a processor in a device that the software is located. In terms of hardware implementation, in addition to the CPU, the memory, and the non-volatile memory shown in FIG. 5, the device in which the apparatus is located generally further includes other hardware such as a chip for sending and receiving radio signals, and/or other hardware such as a card configured to implement a network communication function.

Figure 6:
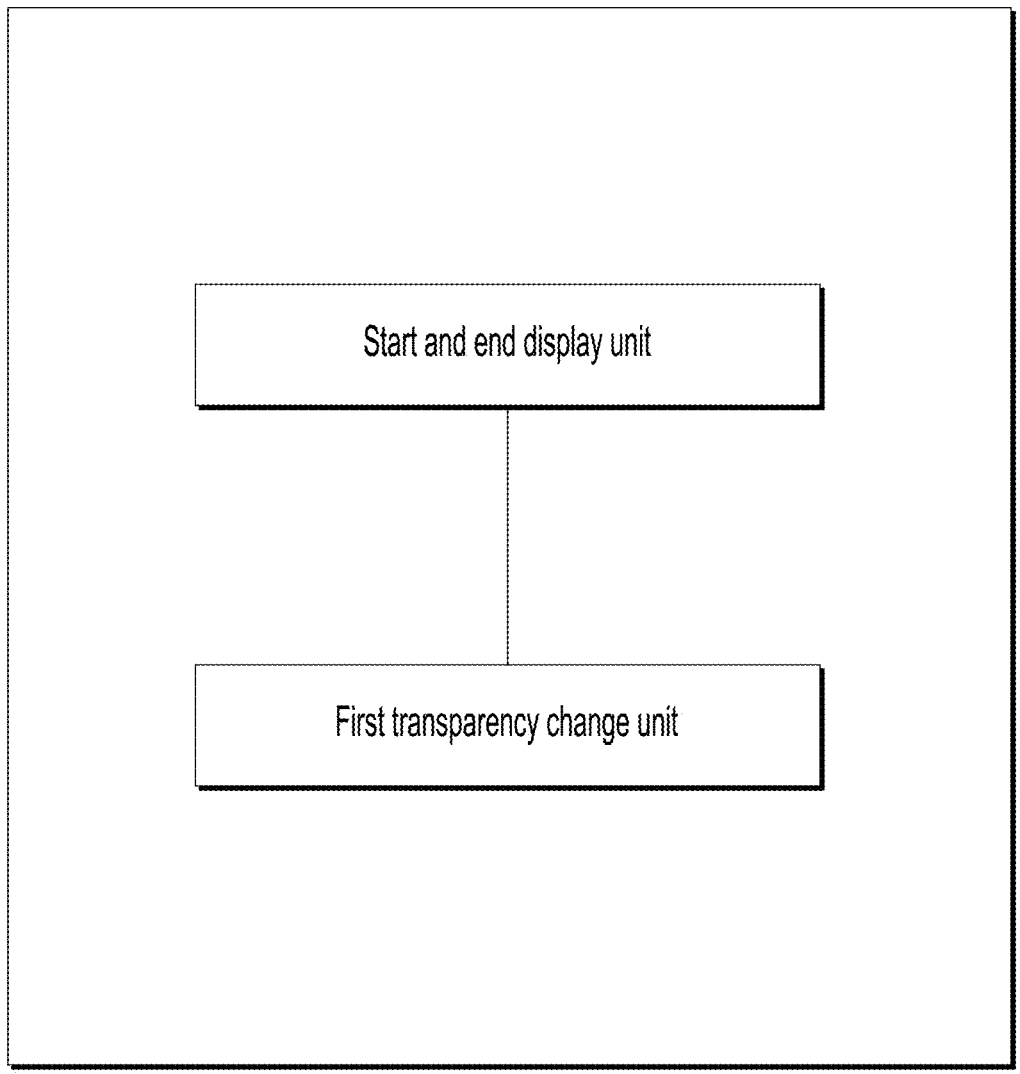
FIG. 6 is a logical structural diagram illustrating an apparatus for realizing color tween animation according to an implementation of the present disclosure.

FIG. 6 shows an apparatus for realizing color tween animation according to an implementation of the present application. A display area of the color tween animation includes two overlapping layers: one layer is non-transparent and the other layer is completely transparent. The apparatus includes a start and end display unit and a first transparency change unit. The start and end display unit is configured to display a start fill scheme at the non-transparent layer and display an end fill scheme at the completely transparent layer. The first transparency change unit is configured to gradually change transparency of the non-transparent layer to completely transparent and gradually change transparency of the completely transparent layer to completely non-transparent.

In an example, the color tween animation includes changing from the first fill scheme to the second fill scheme and sequentially changing to the Nth fill scheme one by one, where N is a natural number greater than 1. The start fill scheme is the first fill scheme, and the end fill scheme is the second fill scheme. The apparatus further includes a second transparency change unit, configured to the following: after the transparency change is completed, if the kth fill scheme displayed at a current non-transparent layer is not the Nth fill scheme, display the (k+1)th fill scheme at a current completely transparent layer; gradually change transparency of the current completely transparent layer to non-transparent, and gradually change transparency of the current completely non-transparent layer to completely transparent; and repeat this step until k is equal to N, where k is a natural number not greater than N.

In the previous example, N is a credit rating of a user, and the kth credit rating corresponds to the kth fill scheme. The apparatus can further include an animation cancellation unit, configured to display the first fill scheme at the non-transparent layer and delete the completely transparent layer for a user whose credit rating is 1.

Optionally, the apparatus further includes an animation end unit, configured to delete the current completely transparent layer after the animation ends.

Optionally, the start fill scheme and the end fill scheme include a fill scheme with effects of gradual change, texture, or pattern.

Optionally, the display area of the color tween animation includes a fixed display area or a dynamically changing display area.

The previous descriptions are merely examples of the implementations of the present application, but are not intended to limit the present application. Any modification, equivalent replacement, or improvement made without departing from the spirit and principle of the present application shall fall within the protection scope of the present application.

In a typical configuration, the computing device includes one or more processors (CPU), an input/output interface, a network interface, and a memory.

The memory can include a non-persistent memory, a random access memory (RAM), a non-volatile memory, and/or another form that are in a computer-readable medium, for example, a read-only memory (ROM) or a flash memory (flash memory). The memory is an example of the computer-readable medium.

The computer-readable medium includes persistent, non-persistent, movable, and unmovable media that can store information by using any method or technology. The information can be a computer-readable instruction, a data structure, a program module, or other data. An example of a computer storage medium includes, but is not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be configured to store information that a computing device can access. As described in this specification, the computer-readable medium does not include transitory computer-readable media (transitory media), such as a modulated data signal and a carrier.

It should be further noted that, the term "include", "contain", or any other variant thereof is intended to cover a non-exclusive inclusion, so that a process, a method, a commodity, or a device that includes a series of elements not only includes those elements but also includes other elements that are not expressly listed, or further includes elements inherent to such process, method, commodity, or device. An element preceded by "includes a . . . " does not, without more constraints, preclude the existence of additional identical elements in the process, method, commodity, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

Figure 7:
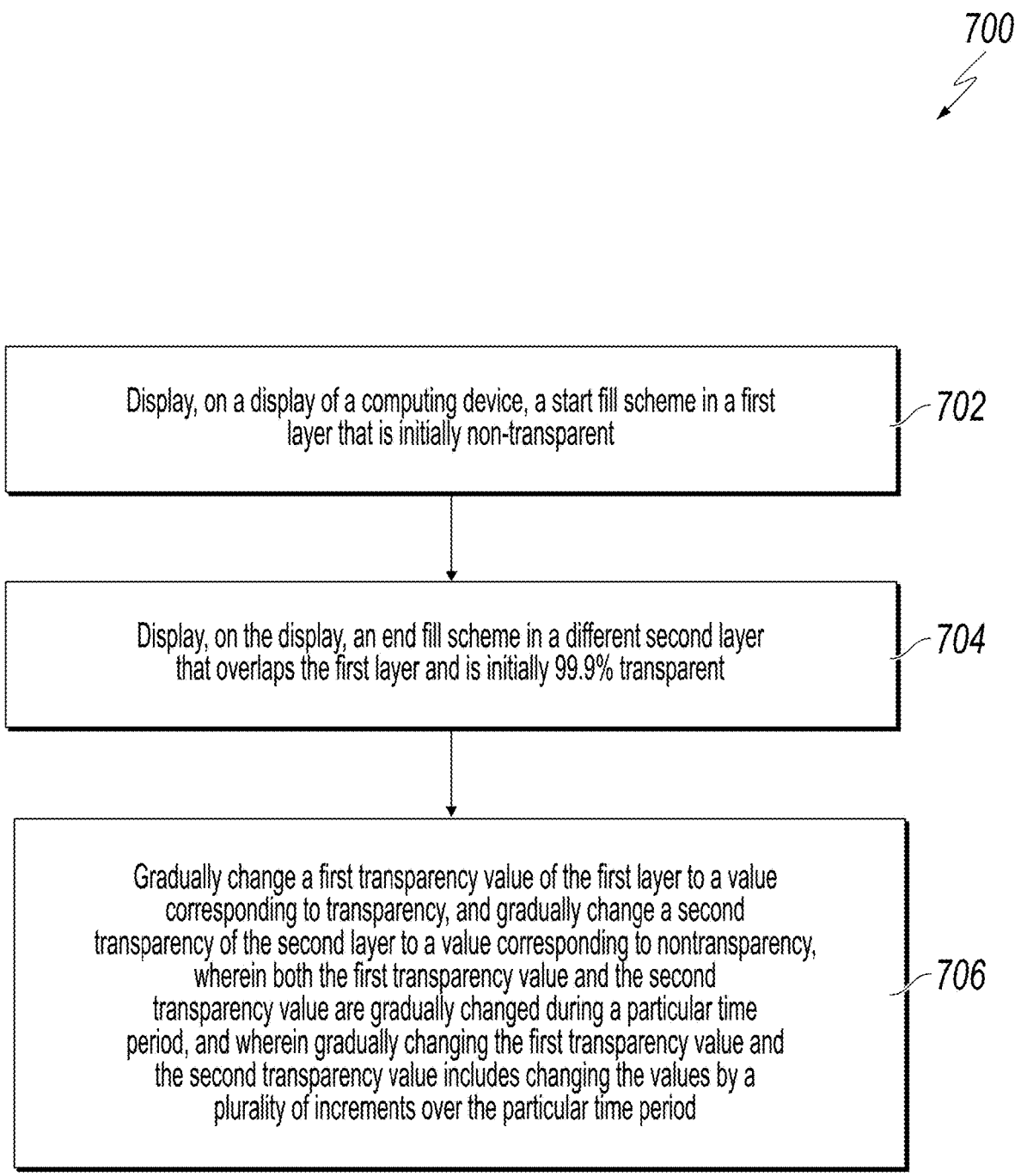
FIG. 7 is a flowchart illustrating an example of a computer-implemented method for performing a color tween animation between two overlapping layers, according to an implementation of the present disclosure.

FIG. 7 is a flowchart illustrating an example of a computer-implemented method 700 for performing a color tween animation between two overlapping layers, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a start fill scheme in a first layer that is initially non-transparent is displayed on a display of a computing device. For example, the start fill scheme and the end fill scheme can combine to provide a fill scheme that presents the effect of a gradual change, a texture, or a pattern. The presented effect can be used, for example, to animate a change of values to a user, such as transitioning from one color-coded credit rating to a different color-coded credit rating.

In some implementations, gradually changing the first and second transparency values can include displaying a color tween animation. For example, the color tween animation can implement a change, on the display area, from a first fill scheme to a second fill scheme. The change can include sequentially changing to an Nth fill scheme, wherein N is an integer greater than 1. The integer N can represent, for example, a numeric credit rating of the user. For example, referring to a first circle in FIG. 3, the first fill scheme can be a red fill scheme in which a color value is gradually changed from #EA5254 to #F4653C, which can represent lower and upper bounds of a poor credit rating range. Additional fill schemes, corresponding to other circles in FIG. 3, can include orange, green, cyan, and blue fill schemes that can each support gradual change effects. To begin the color tween animation, the start fill scheme can be set to the first fill scheme, and the end fill scheme can be set to the second fill scheme. A transparency change can be performed, making alternate ones of the first and second layer transparent. In some implementations, after the transparency change is completed, when a kth fill scheme displayed at a current non-transparent layer is not an Nth fill scheme, a (k+1)th fill scheme can be displayed at a current completely transparent layer, wherein k is a natural number. Transparency of the current completely transparent layer can be gradually changed to non-transparency, and transparency of the current completely non-transparent layer can be gradually changed to completely transparency. The displaying and gradually changing can be repeated until k is greater than or equal to N.

In some implementations, when N is a credit rating of a user, a kth credit rating can correspond to the kth fill scheme. In some implementations, method 700 can further include displaying the first fill scheme at the current non-transparent layer for a user whose credit rating is 1, and deleting the completely transparent layer.

In some implementations, method 700 can further include deleting the current completely transparent layer after the color tween animation ends. For example, the non-transparent layer can be retained, but the transparent layer, which is no longer needed, can be deleted. From 702, method 700 proceeds to 704.

At 704, an end fill scheme in a different second layer that overlaps the first layer and is initially at least partially transparent is displayed on the display. For example, the second layer may be 99.9% transparent. In another example, a color representing a credit rating of the user that is to be displayed at the end of the animation can be established, available for incrementally reducing transparency during the animation to gradually change a color value, for example, from #EA5254 to #F4653C. From 704, method 700 proceeds to 706.

At 706, a first transparency value of the first layer is gradually changed to a value corresponding to transparency, and a second transparency of the second layer is gradually changed to a value corresponding to non-transparency. Both the first transparency value and the second transparency value are gradually changed during a particular time period. Gradually changing the first transparency value and the second transparency value includes changing the values by a plurality of increments over the particular time period. For example, the transparency changes can allow the animation to gradually change the color value from #EA5254 to #F4653C. After 706, method 700 stops.

Smooth and natural animation effects can be created automatically by using simple software techniques without extra work of a designer, thereby improving animation realization efficiency. The change process from one color to another color can appear, to the user, as smooth and natural. This can avoid the need to write code for a frame-by-frame animation to present different content frame-by-frame based on a timeline to form an animation by consecutively playing the frames.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   displaying, on a display of a computing device, a start fill scheme in a first layer that is initially non-transparent;
   displaying, on the display, an end fill scheme in a second layer that overlaps the first layer and is initially at least partially transparent; and
   changing a first transparency value of the first layer to a value corresponding to transparency gradually, and changing a second transparency value of the second layer to a value corresponding to non-transparency gradually to display a color tween animation which comprises displaying the end fill scheme from the start fill scheme gradually, wherein:
      both the first transparency value and the second transparency value are gradually changed during a particular time period simultaneously; and
      changing the first transparency value and the second transparency value includes changing the values by a plurality of increments at a constant speed over the particular time period.

2. The computer-implemented method of claim 1, wherein displaying the color tween animation comprises:
   changing, on the display, from a first fill scheme to a second fill scheme, including sequentially changing to an Nth fill scheme, wherein N is an integer greater than 1;
   setting the start fill scheme to the first fill scheme, and setting the end fill scheme to the second fill scheme;
   performing a transparency change, making alternate one of the first and second layers transparent; and
   when the transparency change is completed:
      when a kth fill scheme displayed at a current non-transparent layer is not the Nth fill scheme, displaying a (k+1)th fill scheme at a current completely transparent layer;
      gradually changing transparency of the current completely transparent layer to non-transparent, and gradually changing transparency of the current non-transparent layer to completely transparent; and
      repeating the displaying and gradually changing until k is greater than or equal to N, wherein k is a natural number.

3. The computer-implemented method of claim 2, wherein N is a credit rating of a user, wherein a kth credit rating corresponds to the kth fill scheme, the method further comprising:
for a user whose credit rating is 1, displaying the first fill scheme at the current non-transparent layer; and
deleting the current completely transparent layer.

4. The computer-implemented method of claim 2, further comprising deleting the current completely transparent layer after the color tween animation ends.

5. The computer-implemented method of claim 2, wherein a display area of the color tween animation comprises a fixed display area.

6. The computer-implemented method of claim 2, wherein a display area of the color tween animation comprises a dynamically changing display area.

7. The computer-implemented method of claim 1, wherein the start fill scheme and the end fill scheme comprise a fill scheme with effects of a gradual change, a texture, or a pattern.

8. A non-transitory, computer-readable medium storing one or more instructions executable by a computer system to perform operations comprising:
displaying, on a display of a computing device, a start fill scheme in a first layer that is initially non-transparent;
displaying, on the display, an end fill scheme in a second layer that overlaps the first layer and is initially at least partially transparent; and
changing a first transparency value of the first layer to a value corresponding to transparency gradually, and changing a second transparency value of the second layer to a value corresponding to non-transparency gradually to display a color tween animation which comprises displaying the end fill scheme from the start fill scheme gradually, wherein:
both the first transparency value and the second transparency value are gradually changed during a particular time period simultaneously; and
changing the first transparency value and the second transparency value includes changing the values by a plurality of increments at a constant speed over the particular time period.

9. The non-transitory, computer-readable medium of claim 8, wherein displaying the color tween animation comprises:
changing, on the display, from a first changing, on the display, from a first fill scheme to a second fill scheme, including sequentially changing to an Nth fill scheme, wherein N is an integer greater than 1;
setting the start fill scheme to the first fill scheme, and setting the end fill scheme to the second fill scheme;
performing a transparency change, making alternate one of the first and second layers transparent; and
when the transparency change is completed:
when a kth fill scheme displayed at a current non-transparent layer is not the Nth fill scheme, displaying a (k+1)th fill scheme at a current completely transparent layer;
gradually changing transparency of the current completely transparent layer to non-transparent, and gradually changing transparency of the current non-transparent layer to completely transparent; and
repeating the displaying and gradually changing until k is greater than or equal to N, wherein k is a natural number.

10. The non-transitory, computer-readable medium of claim 9, wherein N is a credit rating of a user, wherein a kth credit rating corresponds to the kth fill scheme, the operations further comprising:
for a user whose credit rating is 1, displaying the first fill scheme at the current non-transparent layer; and
deleting the current completely transparent layer.

11. The non-transitory, computer-readable medium of claim 9, the operations further comprising deleting the current completely transparent layer after the color tween animation ends.

12. The non-transitory, computer-readable medium of claim 9, wherein a display area of the color tween animation comprises a fixed display area.

13. The non-transitory, computer-readable medium of claim 9, wherein a display area of the color tween animation comprises a dynamically changing display area.

14. The non-transitory, computer-readable medium of claim 8, wherein the start fill scheme and the end fill scheme comprise a fill scheme with effects of a gradual change, a texture, or a pattern.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
displaying, on a display of a computing device, a start fill scheme in a first layer that is initially non-transparent;
displaying, on the display, an end fill scheme in a second layer that overlaps the first layer and is initially at least partially transparent; and
changing a first transparency value of the first layer to a value corresponding to transparency gradually, and changing a second transparency value of the second layer to a value corresponding to non-transparency gradually to display a color tween animation which comprises displaying the end fill scheme from the start fill scheme gradually, wherein:
both the first transparency value and the second transparency value are gradually changed during a particular time period simultaneously; and
changing the first transparency value and the second transparency value includes changing the values by a plurality of increments at a constant speed over the particular time period.

16. The computer-implemented system of claim 15, wherein displaying the color tween animation comprises:
changing, on the display, from a first fill scheme to a second fill scheme, including sequentially changing to an Nth fill scheme, wherein N is an integer greater than 1;
setting the start fill scheme to the first fill scheme, and setting the end fill scheme to the second fill scheme;
performing a transparency change, making alternate one of the first and second layers transparent; and
when the transparency change is completed:
when a kth fill scheme displayed at a current non-transparent layer is not the Nth fill scheme, displaying a (k+1)th fill scheme at a current completely transparent layer;
gradually changing transparency of the current completely transparent layer to non-transparent, and gradually changing transparency of the current non-transparent layer to completely transparent; and repeating the displaying and gradually changing until k is greater than or equal to N, wherein k is a natural number.

17. The computer-implemented system of claim 16, wherein N is a credit rating of a user, wherein a kth credit rating corresponds to the kth fill scheme, the operations further comprising:

for a user whose credit rating is 1, displaying the first fill scheme at the current non-transparent layer; and deleting the current completely transparent layer.

18. The computer-implemented system of claim 16, the operations further comprising deleting the current completely transparent layer after the color tween animation ends.

19. The computer-implemented system of claim 16, wherein a display area of the color tween animation comprises a fixed display area.

20. The computer-implemented system of claim 15, wherein the start fill scheme and the end fill scheme comprise a fill scheme with effects of a gradual change, a texture, or a pattern.

\* \* \* \* \*